(No Model.)

R. D. GLADNEY.
APPARATUS FOR DISTILLING WATER AND OTHER LIQUIDS.

No. 378,881. Patented Mar. 6, 1888.

Witnesses
Geo. H. Cooper Jr.
Florence Davies.

Inventor.
Robert D. Gladney.
By his Attorney
Benj. R. Catlin.

UNITED STATES PATENT OFFICE.

ROBERT DAVIS GLADNEY, OF KEOWNVILLE, ASSIGNOR OF ONE-HALF TO R. B. STEPHENS, OF NEW ALBANY, MISSISSIPPI.

APPARATUS FOR DISTILLING WATER AND OTHER LIQUIDS.

SPECIFICATION forming part of Letters Patent No. 378,881, dated March 6, 1888.

Application filed April 30, 1887. Serial No. 236,701. (No model.)

*To all whom it may concern:*

Be it known that I, ROBERT DAVIS GLADNEY, a citizen of the United States, residing at Keownville, in the county of Union and State of Mississippi, have invented certain new and useful Improvements in Apparatus for Distilling Water and other Liquids; and I do hereby declare the following to be a full, clear, and exact description of the invention, such as will enable others skilled in the art to which it appertains to make and use the same.

The invention relates to an apparatus adapted for various uses, such as the separation of alcohol from vinegar-beer, the distillation of water, and the evaporation and condensation of any vaporizable liquid. Its object is to provide a simple and efficient apparatus adapted to be easily kept in order and to avoid the complex and expensive devices heretofore employed; and it consists in the matters hereinafter described and pointed out.

Figure 1:
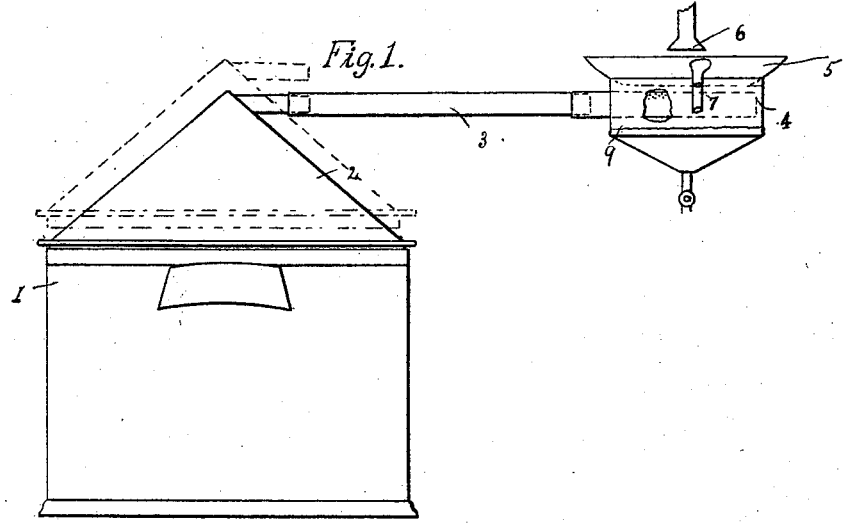
Figure 3:
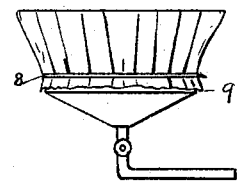
Figure 2:
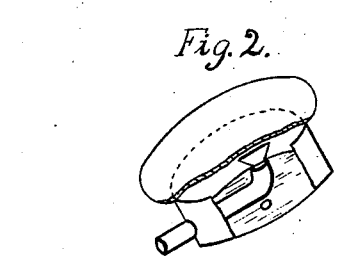
Figure 4:
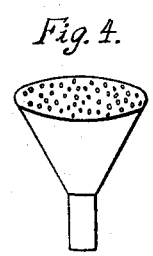
Figure 5:
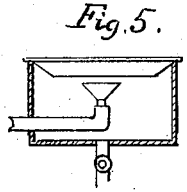

Referring to the accompanying drawings, Figure 1 represents a side elevation of the apparatus, the removable cover being indicated by dotted lines; Fig. 2, an isometric view of the condenser, parts being broken away to show the interior construction. Fig. 3 indicates the condenser provided with a capillary covering; Fig. 4, a rose-head for the vapor-pipe; and Fig. 5 is a detail showing a modified cover for condenser.

The boiler 1 may be made of the general form indicated, having flat bottom and vertical sides and a conical cover, 2. The flat bottom adapts the bottom to be used on any ordinary cooking-stove, or it can be used with a furnace especially provided. The removable conical top by its form is adapted to partially condense the vapors that rise beneath it, for the reason that as the heated air rises on the exterior surface of the boiler counter-currents of comparatively cool air will descend upon the cover and spread downward over its extended conical surface. This has the effect of condensing the heavier vapors beneath the cover. The lighter vapors escape through the eduction-tube 3 into the condensing-chamber 4. This condenser has preferably a conical bottom with a valved exit-pipe, and at its top is provided with an open vessel, 5, constituting a cover to the condenser and adapted for the circulation of water. This may be introduced in any convenient way, as by a rose-head, 6, which sprays the water over the water-chamber, distributing it in an equal manner and adding something to its coolness by partial evaporation of the spray. The vapor introduced under this cover is condensed and can then be withdrawn through the exit-pipe at the bottom.

For the purpose of conducting the hot vapor directly in contact with the bottom of the vessel that covers the condensing-chamber, the tube 3 might be extended under said cover and closed at its end and provided with perforations in its upper side, whereby vapors would be projected upwardly against the cover, or the tube can be provided with a rose-head arranged as indicated in the drawings.

The cover to the condenser is represented as provided with an exit-pipe, 7; but this may be dispensed with under certain circumstances. Thus I may provide a covering, 9, of capillary material, which rests in and over the cover and is secured about the body of the condenser by a band, 8, or otherwise. Water sprayed or otherwise delivered upon the cover or upon this fibrous envelope is carried by capillary attraction through its entire extent and forms a very efficient means of keeping the condenser cool, the water being thus brought in contact with the main body of the condenser and a portion of it evaporated in the open air, which tends to prevent the rising of the temperature in and around the fibrous envelope. The water overflowing from the condenser-cover or escaping from the fibrous envelope may be received into a conduit and delivered through a valved pipe into the boiler in the distillation of water, whereby some of the heat of the vapor will be restored to the boiler. The vessel-like form of the cover obviously is not a necessity if the fibrous cover be used, as such fibrous cover placed over a condenser of any form could be made to hold sufficient water for all practical purposes.

Both the cover of the boiler and that of the condenser may be made removable, in which case it would not be necessary to provide the boiler or its cover with a special inlet, though such inlet would be convenient. For some purposes it is preferred to make the covers and all pipes removable, and all the parts of such size and length that the boiler may be made to receive the other parts and then be closed by its cover, which construction is convenient for transportation and for storage. For this purpose the eduction pipe or pipes may be made in separate close-fitting sections.

The cover of the condenser might be made in the form of an ordinary pan flaring upwardly, and of proper size to rest in the top of the condenser and project downwardly into the same, as shown in Fig. 5. The parts being made separable, it is obvious that such a cover or pan, as well as the boiler, can be used for ordinary purposes when not employed as a water evaporator or still.

In operation the apparatus can be successfully used to remove spirits from fluid mixture containing the same. The mixture having been introduced into the boiler to partially fill the same and heated sufficiently to vaporize the spirits, the vapors rise to the space above the liquid and escape through the connecting-pipe to the condenser.

The heat should not be sufficient to vaporize the acetic acid and other less volatile constituents of the contents of the boiler. Such portions of these as may, however, be incidentally carried up in vapor form under the conical cover will be condensed by the cooler atmosphere prevailing there, while the more volatile spirits will pass out. By a skillful regulation of the heating of the boiler and of the quantity of cooling agent used on the condenser, whereby the pressure in the condenser, connecting-pipe, and boiler may be regulated to a certain extent, the separation or gaging of the distillate may be controlled. So far as concerns one or more of the claims, hereinafter made, it is immaterial what known cooling agent be employed to condense the vapors.

Several features of construction described herein are found in distilling apparatus heretofore used, such as the conical top of the still and a separable condenser. My invention consists in the combinations particularly hereinafter pointed out, and has relation to means for distilling adapted to popular use. The separability of the parts and the concurrent limitation of size of certain parts are features never before suggested in connection with a still, and are material elements of claim herein. This enables a still and condenser to be easily supplied to the community and conveniently stored when not in use, and the first-named feature enables the boiler to be used without the condenser. The flat bottom of the boiler also adapts it for use upon common stoves. The direction of the distilled vapor immediately against the bottom of the open pan which covers the condenser secures certainty and efficiency of action and by the use of simple instrumentalities. My apparatus as a whole is adapted for family use in localities where pure water is difficult to obtain, or wherever it is desirable to secure small or moderate quantities of distilled water. The fibrous covering is not a necessary adjunct, but it adds to the efficiency of the condenser by gradually conducting water down over the surface of the conductor and permitting its partial evaporation.

Having thus described my invention, what I desire to claim, and secure by Letters Patent, is—

1. The combination, in a distilling apparatus, of the flat-bottomed portable boiler having a removable cover, the condenser, the pipe connecting the top of the boiler and the condenser, these parts being made separable and sufficiently small to be inclosed in the boiler, the open removable water-vessel covering the condenser, and a water-supply pipe, all substantially as set forth, whereby the condenser and pipes may be inclosed in the boiler for transportation or storage.

2. The combination, in a distilling apparatus, of the flat-bottomed portable boiler having a removable cover, the condenser, the pipe connecting the top of the boiler and the condenser, these parts being made separable and sufficiently small to be inclosed in the boiler, an extension of the vapor-pipe within the condenser having perforations on its upper side adjacent to the lowest part of the water-vessel covering the same, the open removable water-vessel covering the condenser, and a water-supply pipe, all substantially as set forth.

In testimony whereof I affix my signature in presence of two witnesses.

ROBERT DAVIS GLADNEY.

Witnesses:
Z. M. STEPHENS,
J. B. MARMON.